US007770203B2

(12) United States Patent
McKenna

(10) Patent No.: US 7,770,203 B2
(45) Date of Patent: Aug. 3, 2010

(54) METHOD OF INTEGRATING A SECURITY OPERATIONS POLICY INTO A THREAT MANAGEMENT VECTOR

(75) Inventor: John J. McKenna, Cary, NC (US)

(73) Assignee: International Business Machines Corporation, Armonk, NY (US)

( * ) Notice: Subject to any disclaimer, the term of this patent is extended or adjusted under 35 U.S.C. 154(b) by 754 days.

(21) Appl. No.: 11/736,068

(22) Filed: Apr. 17, 2007

(65) Prior Publication Data

US 2008/0263664 A1   Oct. 23, 2008

(51) Int. Cl.
*H04L 29/06* (2006.01)
*G06F 21/00* (2006.01)

(52) U.S. Cl. ................................. 726/1; 726/23; 726/25
(58) Field of Classification Search .................. 726/1, 726/22, 23, 24, 25
See application file for complete search history.

(56) References Cited

U.S. PATENT DOCUMENTS

| | | | |
|---|---|---|---|
| 6,374,358 B1* | 4/2002 | Townsend | 726/1 |
| 6,530,024 B1 | 3/2003 | Proctor | |
| 2003/0014644 A1 | 1/2003 | Burns et al. | |
| 2003/0041267 A1* | 2/2003 | Fee et al. | 713/201 |
| 2003/0065942 A1* | 4/2003 | Lineman et al. | 713/201 |
| 2004/0193912 A1 | 9/2004 | Li et al. | |
| 2005/0022021 A1 | 1/2005 | Bardsley et al. | |
| 2005/0039046 A1 | 2/2005 | Bardsley et al. | |
| 2005/0076243 A1 | 4/2005 | Morohashi et al. | |
| 2005/0198520 A1 | 9/2005 | Bardsley et al. | |
| 2005/0257244 A1 | 11/2005 | Joly et al. | |
| 2006/0015941 A1 | 1/2006 | McKenna | |

OTHER PUBLICATIONS

Burns et al., "Automatic Management of Network Security Policy," Telcordia Technologies, Inc., 2001, 15 pages.
Jo et al., "Design of Policy-based Security Management for Intrusion Detection," International Conference on Security Management—SAM 2003, Korea.

* cited by examiner

*Primary Examiner*—Gilberto Barron, Jr.
*Assistant Examiner*—Cordelia Kane
(74) *Attorney, Agent, or Firm*—John Pivnichny; Hoffman Warnick LLC

(57) ABSTRACT

The invention relates to the integration of a security operations policy into a threat management vector. In one embodiment, a method according to the invention includes receiving at least one threat management vector (TMV) from a TMV generator, the TMV including a root vulnerability vector, at least one system vector, at least one system level vector, and a countermeasures payload including intrusion detection countermeasures (IDC), intrusion response countermeasures (IRC), and vulnerability remediation countermeasures (VRC); forwarding to the TMDC a TMV including only the root vulnerability vector, the at least one system vector, and the at least one system level vector; propagating the TMV through a hierarchy of policy mediation regions (PMRs), each PMR being operable to refine at least one of the IDC, the IRC, and the VRC; refining at least one of the IDC, the IRC, and the VRC to conform to a security operations policy of the PMR; forwarding the refined TMV to a threat management domain controller (TMDC); recording refinements made by each PMR to each of the IDC, the IRC, and the VRC; transferring the recorded refinements to a threat management control book (TMCB); and marking the refined TMV as having been refined by each PMR making a refinement.

8 Claims, 3 Drawing Sheets

METHOD OF INTEGRATING A SECURITY OPERATIONS POLICY INTO A THREAT MANAGEMENT VECTOR

CROSS-REFERENCE TO RELATED APPLICATIONS

This application is related, in some respects, to U.S. patent application Ser. Nos. 10/624,158 and 10/624,344, each filed 22 Jul. 2003, U.S. patent application Ser. No. 10/791,560, filed 2 Mar. 2004, and U.S. patent application Ser. No. 10/890,798, filed 13 Jul. 2004, each of which is hereby incorporated herein.

FIELD OF THE INVENTION

The invention relates generally to computer security and threat management, and more particularly, to policy mediation of automated threat management countermeasures, particularly across a collection of domains of computer systems.

BACKGROUND OF THE INVENTION

U.S. patent application Ser. No. 10/624,344 to Bardsley et al. (hereinafter "the '344 application") describes a means for instrumenting threat management information so as to permit automation of the application of threat countermeasures to arbitrary program instances at target systems. The '344 application further describes a method for assimilating free-form security vulnerability and countermeasure information into a construction known as a Threat Management Vector (TMV) for the purpose of conveying precise and actionable threat management information to a network of computer systems.

U.S. patent application Ser. No. 10/624,158 to Bardsley et al. (hereinafter "the '158 application") describes a method and apparatus for the automated application of threat countermeasures at target systems using a specific transmutation of the TMV described in the '344 application.

U.S. patent application Ser. No. 10/791,560 to Bardsley et al. (hereinafter "the '560 application") describes a Threat Management Domain Controller (TMDC) for coordinating interactions between a centralized TMV source and target computer systems within a domain. The '560 application also describes a self-healing threat management messaging network.

U.S. patent application Ser. No. 10/890,798 to McKenna (hereinafter "the '798 application") describes multiple classes of countermeasures, namely, intrusion detection countermeasures (IDCs), intrusion response countermeasures (IRCs), and vulnerability remediation countermeasures (VRCs), within the countermeasures vector of a TMV. The '798 application also describes methods for the use of such countermeasures classes to discover and repair security intrusions that exist before vulnerability remediation countermeasures are applied. Thus, the methods and systems of the '344 application, the '158 application, and the '560 application could be applied to a computer system with an already-exploited security vulnerability.

While the applications above describe methods to automatically detect, respond to, and remediate computer security vulnerabilities, the successful application of such methods within an organization often requires consideration of, and adherence to, one or more security operations policies of the organization. In large or complex organizations, such security operations policies often comprise a policy hierarchy, with an overall policy applicable to all divisions of the organization and lower-level policies applicable to particular divisions of the organization. Typically, the lowest-level policy in such a hierarchy includes a policy applicable to the particular domain with which a computer system is associated.

It is possible that the countermeasures contained within a TMV are incompatible with one or more policies within such a policy hierarchy or that the application of the countermeasures in accordance with one policy will create an inability to comply with another policy within the hierarchy.

Accordingly, there exists a need in the art to overcome the deficiencies and limitations described hereinabove.

SUMMARY OF THE INVENTION

The invention relates to the integration of a security operations policy into a threat management vector. In one embodiment, a method according to the invention includes receiving at least one threat management vector (TMV) from a TMV generator, the TMV including a root vulnerability vector, at least one system vector, at least one system level vector, and a countermeasures payload including intrusion detection countermeasures (IDC), intrusion response countermeasures (IRC), and vulnerability remediation countermeasures (VRC); forwarding to the TMDC a TMV including only the root vulnerability vector, the at least one system vector, and the at least one system level vector; propagating the TMV through a hierarchy of policy mediation regions (PMRs), each PMR being operable to refine at least one of the IDC, the IRC, or the VRC; refining at least one of the IDC, the IRC, and the VRC to conform to a security operations policy of the PMR; forwarding the refined TMV to a threat management domain controller (TMDC); recording refinements made by each PMR to each of the IDC, the IRC, and the VRC; transferring the recorded refinements to a threat management control book (TMCB); and marking the refined TMV as having been refined by each PMR making a refinement.

A first aspect of the invention provides a method of integrating a security operations policy into a threat management vector, the method comprising: receiving at least one threat management vector (TMV) from a TMV generator, the TMV including a root vulnerability vector, at least one system vector, at least one system level vector, and a countermeasures payload including intrusion detection countermeasures (IDC), intrusion response countermeasures (IRC), and vulnerability remediation countermeasures (VRC); propagating the TMV through a hierarchy of policy mediation regions (PMRs), each PMR being operable to refine at least one of the IDC, the IRC, or the VRC; refining at least one of the IDC, the IRC, and the VRC to conform to a security operations policy of the PMR; and forwarding the refined TMV to a threat management domain controller (TMDC).

A second aspect of the invention provides a method of supplying a computer system with a threat management vector, the method comprising: registering a computer system with a first threat management domain controller (TMDC); and in the case that the computer system was previously registered with a second TMDC: reporting to the first TMDC all threat management vector generation numbers (TMVGNs) received from the second TMDC; propagating each TMVGN upward through a policy mediation region (PMR) hierarchy; decomposing each TMVGN until an original source TMV is obtained; regenerating a refined TMV from the original source TMV by propagating the TMV downward through the PMR hierarchy; and forwarding the refined TMV to the first TMDC.

A third aspect of the invention provides a program product stored on a computer-readable medium, which when executed, integrates a security operations policy into a threat management vector, the program product comprising: program code for receiving at least one threat management vector (TMV) from a TMV generator, the TMV including a root vulnerability vector, at least one system vector, at least one system level vector, and a countermeasures payload including intrusion detection countermeasures (IDC), intrusion response countermeasures (IRC), and vulnerability remediation countermeasures (VRC); program code for propagating the TMV through a hierarchy of policy mediation regions (PMRs), each PMR being operable to refine at least one of the IDC, the IRC, and the VRC; program code for refining at least one of the IDC, the IRC, and the VRC to conform to a security operations policy of the PMR; and program code for forwarding the refined TMV to a threat management domain controller (TMDC).

A fourth aspect of the invention provides a system for integrating a security operations policy into a threat management vector, the system comprising: a system for receiving at least one threat management vector (TMV) from a TMV generator, the TMV including a root vulnerability vector, at least one system vector, at least one system level vector, and a countermeasures payload including intrusion detection countermeasures (IDC), intrusion response countermeasures (IRC), and vulnerability remediation countermeasures (VRC); a system for propagating the TMV through a hierarchy of policy mediation regions (PMRs), each PMR being operable to refine at least one of the IDC, the IRC, and the VRC; a system for refining at least one of the IDC, the IRC, and the VRC to conform to a security operations policy of the PMR; and a system for forwarding the refined TMV to a threat management domain controller (TMDC).

A fifth aspect of the invention provides a method for deploying an application for integrating a security operations policy into a threat management vector, comprising: providing a computer infrastructure being operable to: receive at least one threat management vector (TMV) from a TMV generator, the TMV including a root vulnerability vector, at least one system vector, at least one system level vector, and a countermeasures payload including intrusion detection countermeasures (IDC), intrusion response countermeasures (IRC), and vulnerability remediation countermeasures (VRC); propagate the TMV through a hierarchy of policy mediation regions (PMRs), each PMR being operable to refine at least one of the IDC, the IRC, and the VRC; refine at least one of the IDC, the IRC, and the VRC to conform to a security operations policy of the PMR; and forward the refined TMV to a threat management domain controller (TMDC).

The illustrative aspects of the present invention are designed to solve the problems herein described and other problems not discussed, which are discoverable by a skilled artisan.

BRIEF DESCRIPTION OF THE DRAWINGS

These and other features of this invention will be more readily understood from the following detailed description of the various aspects of the invention taken in conjunction with the accompanying drawings that depict various embodiments of the invention, in which.

It is noted that the drawings of the invention are not to scale. The drawings are intended to depict only typical aspects of the invention, and therefore should not be considered as limiting the scope of the invention. In the drawings, like numbering represents like elements between the drawings.

DETAILED DESCRIPTION

As indicated above, the invention relates to the integration of a security operations policy into a threat management vector.

Figure 1:
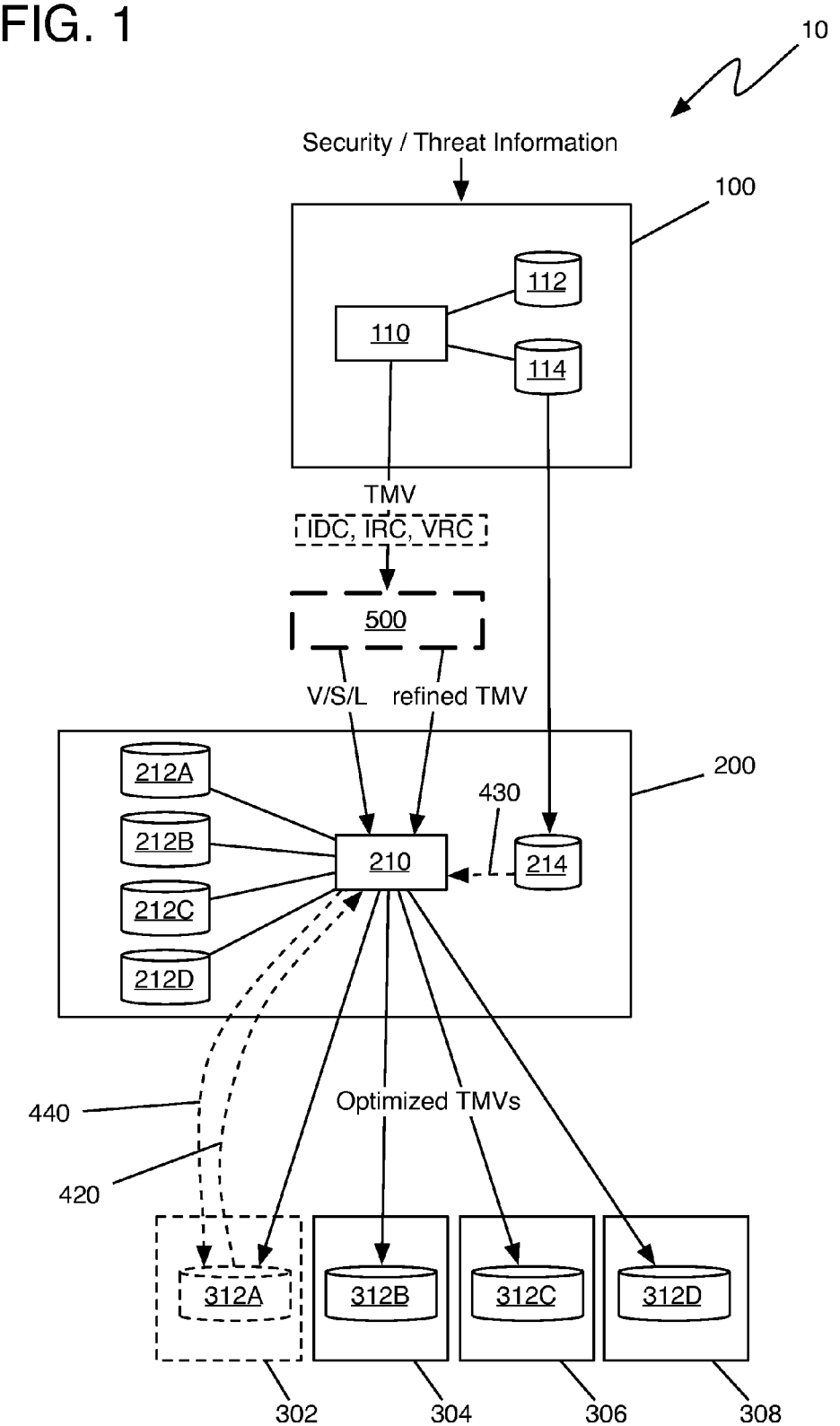
FIG. 1 shows a block and flow diagram of a threat management policy effector (TMPE) according to an embodiment of the invention within a threat management system.

FIG. 1 shows a threat management system 10 comprising a threat management vector (TMV) generating system 100 as described in the '344 application, a threat management domain controller (TMDC) system 200 as described in the '560 application, target computer systems 302-308 as described in the '158 application, and a threat management policy effector (TMPE) 500 according to an embodiment of the present invention. As shown in FIG. 1 and will be described in greater detail below, the TMV generated by TMV generating system 100 may include intrusion detection countermeasures (IDCs), intrusion response countermeasures (IRCs), and/or vulnerability remediation countermeasures (VRCs), as described in the '798 application.

As described in the '344 application, TMV generating system 100 includes a TMV generator 110, a threat management control book (TMCB) 112 and a TMV history 114, the later two comprising stored metadata.

As will be described in greater detail below, the TMPE 500 receives the TMV, along with its IDCs, IRCs, and VRCs, from TMV generator 110 and forwards a "refined" TMV conforming to at least one security operations policy to a TMDC 210. Preferably, TMPE 500 also forwards to the TMDC 210 a TMV including only a root vulnerability vector, one or more system vectors, and one or more system level vectors (i.e., an unrefined TMV without any IDCs, IRCs, or VRCs.

As described in the '560 application, TMDC system 200 includes a TMDC 210, a TMV domain store and forward repository (DSFR) 214, and threat management information bases (TMIBs) 212A-D corresponding to TMIBs 310A-D in target computer systems 302-308. Thus, optimized TMVs may be forwarded to TMIBs 310A-D within target computer system 300 based on the TMIBs 212A-D of TMDC system 200.

As described in the '798 application, in the event that an IDC detects an intrusion (e.g., an intrusion of target computer system 302, shown in phantom in FIG. 1), the affected target system requests 420 IRCs from TMDC 210, which retrieves 430 such countermeasures from its DSFR 214 and forwards 440 the IRCs to the target computer system (i.e. target computer system 302). The IRCs and VRCs may then be scheduled and executed by the target computer system 302.

Figure 2:
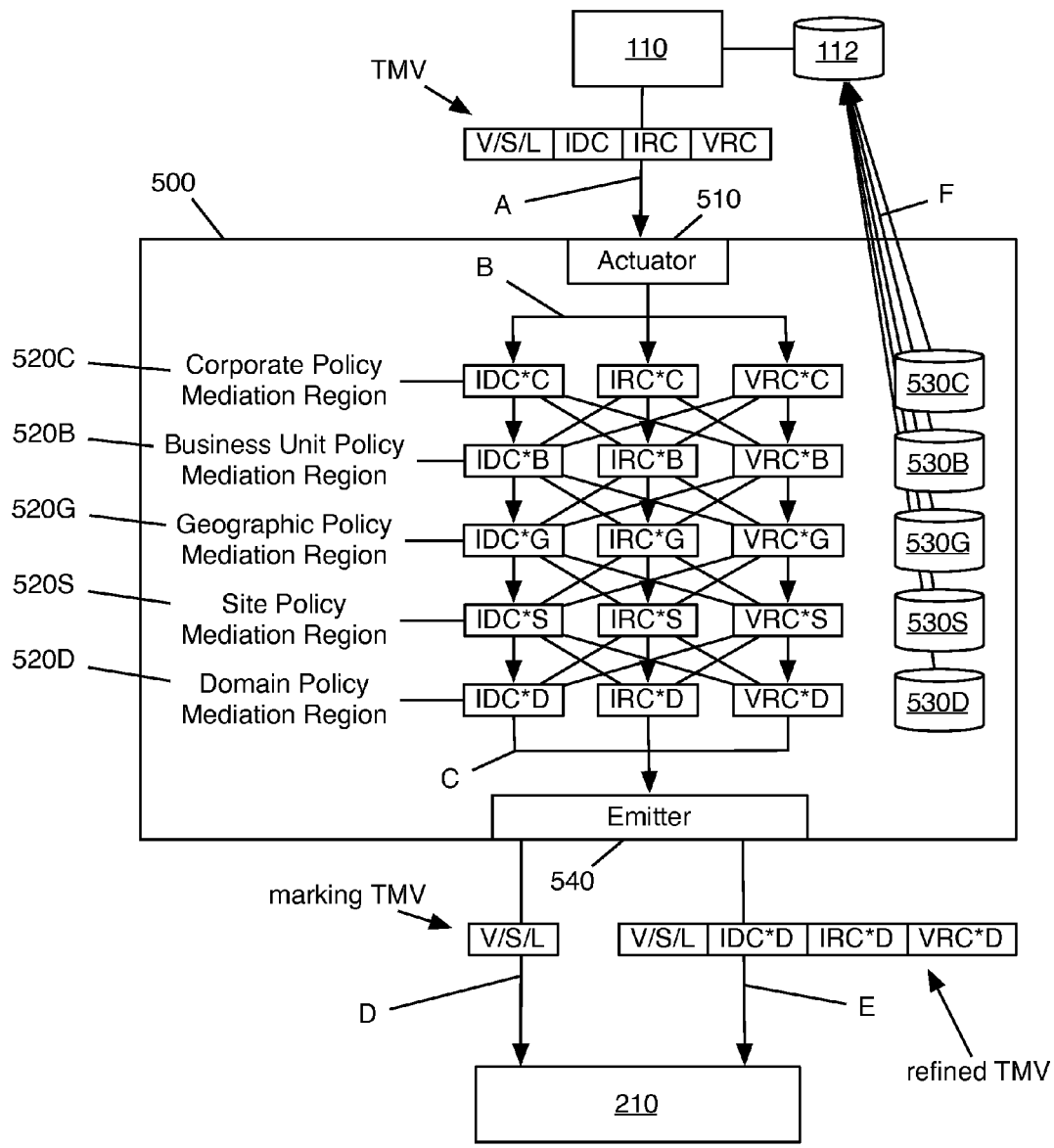
FIG. 2 shows a detailed view of the TMPE of FIG. 1.

FIG. 2 shows a detailed view of a portion of FIG. 1. Specifically, FIG. 2 shows details of the TMPE 500 and its interactions with TMV generator 110 and TMDC 210. A TMV including a root vulnerability vector, one or more system vectors, and one or more system level vectors (V/S/L), along with an IDC, IRC, and/or VRC, is received A by TMPE 500. An actuator 510 propagates B the IDC, IRC, and VRC through one or more Policy Mediation Regions (PMRs) arranged in a hierarchy.

As shown in FIG. 2, the PMR hierarchy comprises a corporate PMR 520C, a business unit PMR 520B, a geographic PMR 520G, a site PMR 520S, and a domain PMR 520D. The PMRs shown in FIG. 2 are merely illustrative of the types of security operations policies that may exist in a particular organization. Here, the corporate PMR 520C is applicable to all divisions and subdivisions of the organization, the business unit PMR 520B is applicable only to a particular business unit of the organization, the geographic PMR 520G is applicable to business units or their subdivisions operating in a particular geographic area (e.g., in a particular country), the site PMR 520S is applicable to a sites within the particular geographic area, and the domain PMR 520D is applicable to a domain within the site.

Each PMR refines the IDC, IRC, and VRC based on its own security operations policy and passes the refined IDC, IRC, and VRC to the next-highest level in the hierarchy (e.g., once the IDC, IRC, and VRC are refined by the corporate PMR 520C, they are passed to the business unit PMR 520B as a refined TMV, whereupon the business unit PMR 520B further refines the IDC, IRC, and VRC based on its security operations policy.

Preferably, each PMR marks the refined TMV forwarded to the next-highest PMR in the hierarchy, such that each refined TMV itself shows the PMRs that have refined its IDC, IRC, and/or VRC at any point along its propagation through the hierarchy.

In addition to the subsequent refining by individual PMRs described above, each PMR refines each of the IDC, IRC, and VRC in view of previous refinements to other components. That is, still referring to FIG. 2, the business unit PMR 520B refines the IDC in view not only of its own security operations policy, but also the refinements to the IRC and VRC made by the corporate PMR 520C. Thus, inconsistencies and incompatibilities among the refined IDC, IRC, and VRC are avoided.

Once each PMR has refined the IDC, IRC, and VRC, a refined TMV including the V/S/L and refined IDC, IRC, and VRC, is forwarded E to TMDC 210 via an emitter 540.

Preferably, simultaneously or nearly simultaneously with the propagation B of the IDC, IRC, and VRC through the PMR hierarchy, a marking TMV including only the V/S/L is forwarded D to the TMDC 210. Because the V/S/L is not processed by the PMR hierarchy, it is forwarded D to the TMDC 210 sooner than the refined TMV.

Still referring to FIG. 2, each PMR includes a history storage system 530C, 530B, 530G, 530S, 530D, capable of recording the refinements made by each PMR. These histories may then be transferred F to the TMCB 112.

In the case that a security operations policy of one or more PMRs is updated or otherwise changed, a superseding TMV may be generated based on the updated or changed security operations policy and the superseding TMV forwarded to the TMDC 210.

Figure 3:
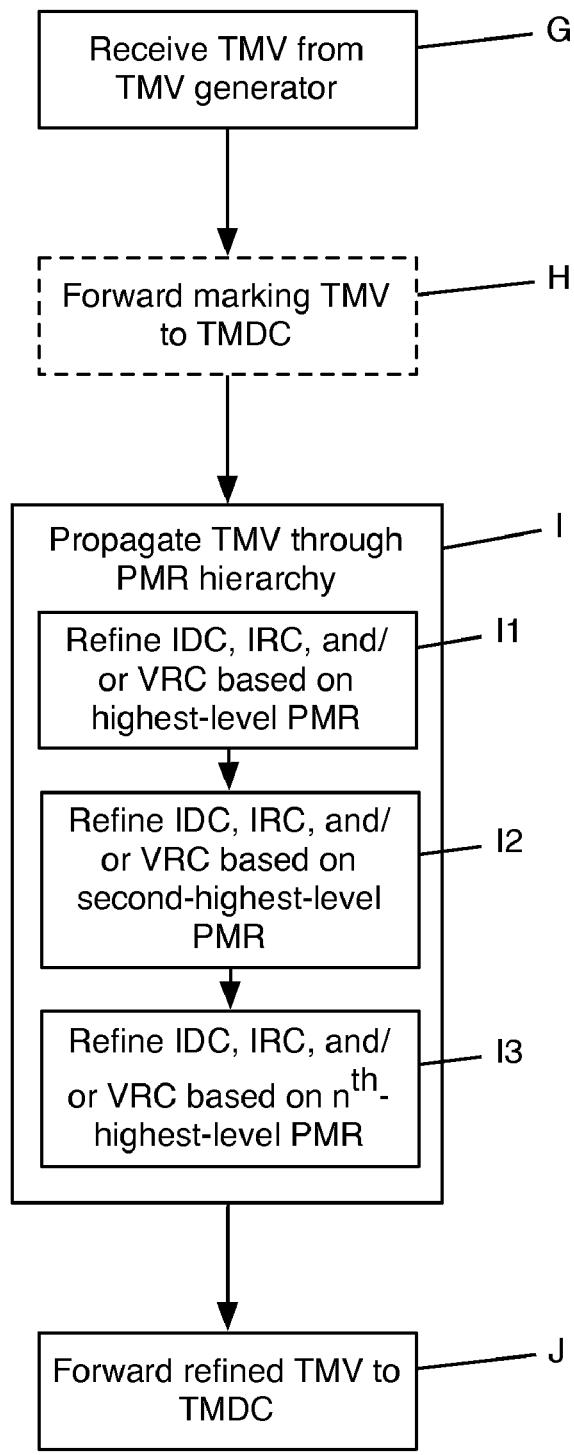
FIG. 3 shows a flow diagram of an illustrative method according to an embodiment of the invention.

Referring now to FIG. 3, a flow diagram of an illustrative method according to the invention is shown. At G, a TMV is received (e.g., by actuator 510 in FIG. 2) from a TMV generator (110 in FIG. 2). At H, a marking TMV may optionally be forwarded to a TMDC (210 in FIG. 2), as described above.

At I, the TMV received at G is propagated through a PMR hierarchy. At I1, the IDC, IRC and/or VRC of the TMV is revised at the highest-level PMR in the hierarchy. The TMV is then passed to the second-highest-level PMR in the hierarchy, whereupon the IDC, IRC, and/or VRC are revised again at I2. This continues until the lowest-level PMR in the hierarchy is reached and the IDC, IRC, and/or VRC are revised at I3. Finally, the TMV, as revised by each PMR, is forwarded to the TMDC at J.

As the TMV is modified by each PMR, a threat management vector generation number (TMVGN) associated with the original TMV is augmented. Preferably, such augmentation is specific to each PMR, such that, at any step in the propagation of the TMV through the PMR hierarchy, one could determine which PMRs had revised the TMV and, if desired, one could reconstruct the TMV as it would have existed at any step in the propagation, eventually arriving at the original TMV (and TMVGN) generated by the TMV generator.

Thus, as the TMV is propagated through the PMR hierarchy, there is eventually no discernible relationship among PMRs of any numeric portion of the TMVGNs, except what is held in relational PMR history databases. Collectively, these databases allow the decoding of a revised TMV to obtain the original TMV.

This may be particularly useful, for example, where a computer is to be reregistered with a new TMDC. One would report to the new TMDC all TMVGNs received from the previous TMDC, propagate each TMVGN upward through the previous PMR hierarchy to obtain the original source TMV, and regenerate a refined TMV from the original source TMV by propagating the TMV downward through the new PMR hierarchy.

The foregoing description of various aspects of the invention has been presented for purposes of illustration and description. It is not intended to be exhaustive or to limit the invention to the precise form disclosed, and obviously, many modifications and variations are possible. Such modifications and variations that may be apparent to a person skilled in the art are intended to be included within the scope of the invention as defined by the accompanying claims.

What is claimed is:

1. A method of integrating a security operations policy into a threat management vector, the method comprising:
receiving at least one threat management vector (TMV) from a TMV generator, the TMV including a root vulnerability vector, at least one system vector, at least one system level vector, and a countermeasures payload including intrusion detection countermeasures (IDC), intrusion response countermeasures (IRC), and vulnerability remediation countermeasures (VRC);
propagating the TMV through a hierarchy of policy mediation regions (PMRs), each PMR being operable to refine at least one of the IDC, the IRC, and the VRC;
refining at least one of the IDC, the IRC, or the VRC to conform to a security operations policy of the PMR; and
forwarding the refined TMV to a threat management domain controller (TMDC).

2. The method of claim 1, further comprising:
forwarding to the TMDC a TMV including only the root vulnerability vector, the at least one system vector, and the at least one system level vector.

3. The method of claim 1, wherein the hierarchy of PMRs includes at least one PMR selected from a group consisting of: a corporate PMR, a business unit PMR, a geographic PMR, a site PMR, and a domain PMR.

4. The method of claim 1, wherein refining includes:
collaborating refinements between at least one pairing selected from a group consisting of:
a non-refined IDC and a refined IRC;
a non-refined IDC and a refined VRC;
a non-refined IRC and a refined IDC;
a non-refined IRC and a refined VRC;
a non-refined VRC and a refined IDC; and
a non-refined VRC and a refined IRC;
consolidating the refinements in a refined TMV; and
passing the refined TMV to a PMR lower in the hierarchy.

5. The method of claim 1, further comprising:
recording refinements made by each PMR to each of the IDC, the IRC, and the VRC;

transferring the recorded refinements to a threat management control book (TMCB); and marking the refined TMV as having been refined by each PMR making a refinement.

6. The method of claim 5, further comprising:

updating a security operations policy of at least one PMR;

generating a superseding TMV based on the updated security operations policy; and forwarding the superseding TMV to the TMDC.

7. A method of supplying a computer system with a threat management vector, the method comprising:

registering a computer system with a first threat management domain controller (TMDC); and in the case that the computer system was previously registered with a second TMDC:

reporting to the first TMDC all threat management vector generation numbers (TMVGNs) received from the second TMDC;

propagating each TMVGN upward through a policy mediation region (PMR) hierarchy;

decomposing each TMVGN until an original source TMV is obtained;

regenerating a refined TMV from the original source TMV by propagating the TMV downward through the PMR hierarchy; and forwarding the refined TMV to the first TMDC.

8. A program product stored on a computer-readable medium, which when executed, integrates a security operations policy into a threat management vector, the program product comprising:

program code for receiving at least one threat management vector (TMV) from a TMV generator, the TMV including a root vulnerability vector, at least one system vector, at least one system level vector, and a countermeasures payload including intrusion detection countermeasures (IDC), intrusion response countermeasures (IRC), and vulnerability remediation countermeasures (VRC);

program code for propagating the TMV through a hierarchy of policy mediation regions (PMRs), each PMR being operable to refine at least one of the IDC, the IRC, and the VRC;

program code for refining at least one of the IDC, the IRC, and the VRC to conform to a security operations policy of the PMR; and program code for forwarding the refined TMV to a threat management domain controller (TMDC).

* * * * *